United States Patent Office 3,365,633
Patented Jan. 23, 1968

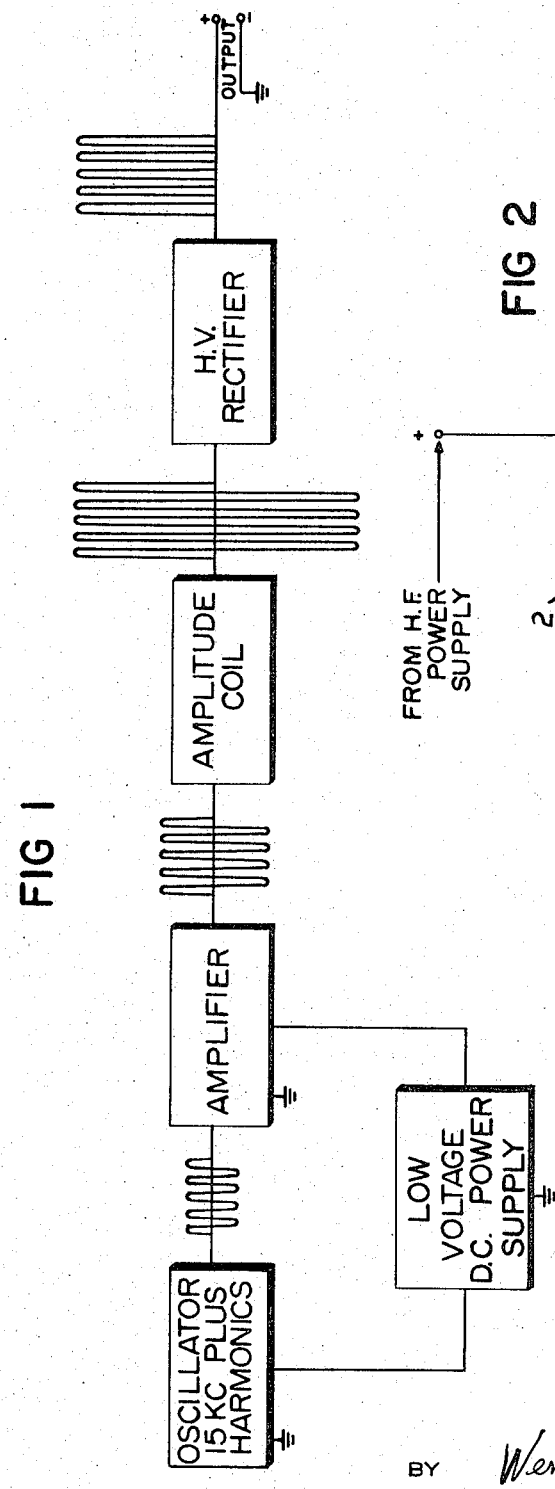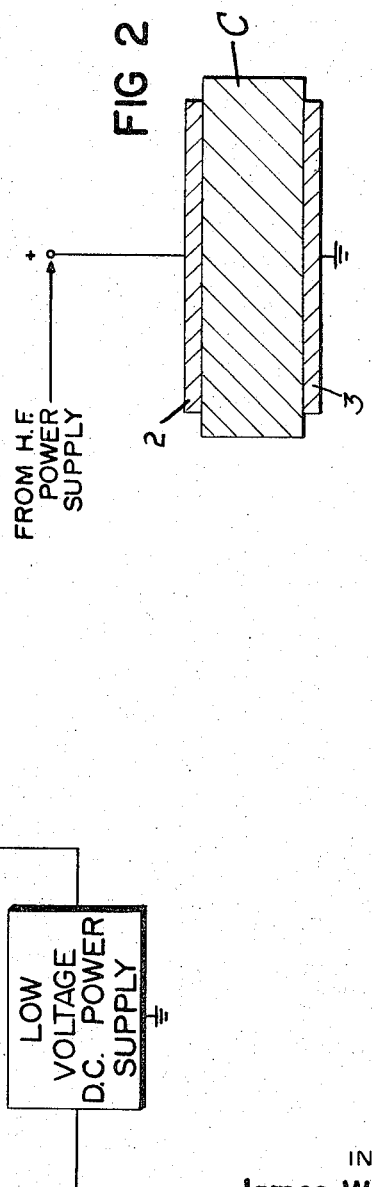
INVENTORS
James W. Anderson
Steve L. Heny

3,365,633
METHOD OF TREATING POLYCRYSTALLINE CERAMICS FOR POLARIZING THEM
James W. Anderson, State College, and Steve L. Heny, Hublersburg, Pa., assignors to Linden Laboratories, Inc., State College, Pa.
Filed May 27, 1965, Ser. No. 459,390
3 Claims. (Cl. 317—262)

ABSTRACT OF THE DISCLOSURE

A method of polarizing a polycrystalline ceramic body, consisting of the steps of generating a direct current from an alternating current voltage having a frequency in the range of from 15–25 kc., and applying across the thickness of the body the thus generated direct current at a voltage of from 50–200 volts per mil thickness of the body.

---

The present invention relates to a method of treating polycrystalline ceramics for polarizing them.

It has been known for some time that it is desirable to treat polycrystalline ceramics so as to produce crystal domain orientation in order to improve the piezoelectric properties of the ceramics. However, the conventional methods of polarizing such ceramics have been either to apply to the ceramic bodies a high voltage direct current obtained from a 60 cycle A.C. supply, or to subject the bodies to vibrations at their fundamental resonances, or combinations of both methods.

These methods have several drawbacks, the chief effect of which is to create hazards to the stability of the ceramics. For example, when a high voltage direct current obtained from an A.C. supply is applied to the ceramics, there is superimposed on the direct current voltage an alternating current ripple, which creates heating during the polarization operation. A D.C. voltage of from 50 to 100 v. per mil (.001 inch) thickness of the ceramics, which voltage has a high A.C. ripple in it, and a current of 0.5 to 2 milliamps for 10 square inches of surface will create sufficient heat in the ceramic to produce arcing, dielectric breakdown, thermal cracking, and even chemical changes in the ceramic material itself. The vibration at high fundamental resonant frequencies also produces relatively large amounts of heat, and consequent heat deterioration of the ceramics.

It is an object of the present invention to provide a method of polarizing polycrystalline ceramic materials which eliminates the drawbacks of prior art methods.

It is a further object of the invention to provide a method of polarizing polycrystalline ceramic materials which eliminates excessive heating and the effects thereof.

It is a still further object of the present invention to provide a method of polarizing polycrystalline ceramic materials which eliminates the need to supplement a method of polarizing such ceramics by the application of a voltage thereto with a method which comprises vibrating the ceramics at their fundamental resonance frequency.

We have now found that to accomplish these objects, a high D.C. voltage produced from a high frequency A.C. voltage can be used, and not only can the amount of current, and hence the heating effect be reduced, but the polarization effect is so good that the supplemental vibration at the fundamental resonance frequency can be eliminated, thereby eliminating any heating effect of such a polarizing treatment.

Broadly, the method according to the invention comprises applying to the ceramic bodies, such as lead zirconate titanate, a high frequency D.C. voltage produced from an A.C. voltage having a frequency in the range of 15–25 kc. at a rate of from 50–200 volts per mil thickness of the ceramic and for periods of from about 15 to 30 minutes. When this is done, the temperatures of the bodies of ceramic material range from only 25 to 200° C.

The invention will now be described in greater detail with reference to the accompanying drawings, in which:

FIG. 1 is a block diagram of the power supply used to carry out the method of the present invention; and FIG. 2 is a diagrammatic sketch of the manner of applying the voltage to the ceramic body.

Referring to the figures, the power suply shown in FIG. 1 comprises a low voltage D.C. power supply coupled to a conventional oscillator generating an oscillating voltage of 15 kc. plus harmonics thereof, and to an amplifier to which the output of the oscillator is fed. The amplifier amplifies the voltage of the oscillator, and the output of the amplifier is fed to an amplitude coil which increases the amplitude of the oscillations. The increased amplitude high frequency voltage is then fed through a high voltage rectifier. All of these components of the power supply are conventional, and should be of a size to produce a high frequency output voltage of from 25 to 25 kc. at voltages of from 1,000 to 30,000 volts and sufficient current capacity to produce up to 2 milliamps per square inch for the size of the bodies which are to be polarized.

The ceramic body C to be polarized is then placed between two electrodes 2 and 3, one of which is connected to the output of the high voltage rectifier of the power supply and the other of which is grounded, and the high voltage, direct current from the high frequency A.C. source is passed across the ceramic body to polarize it.

In practice it has been found that by using the high frequency voltage as a source of direct current, we can apply from about 50 to about 200 volts per mil thickness of the ceramic to such ceramics as lead zirconate-titanate, with total voltages applied to the bodies of from about 1,000 to about 30,000 volts. These voltages are applied for periods of from about 15 to about 30 minutes. The current which is drawn depends on the ceramic area being polarized and on the temperature at which polarization is carried out, which can be from 25–200° C. A specific example of the application of this method to the polarization of a ceramic body will be set forth in connection with the following example.

Example I

A lead zirconate-titanate ceramic body ¼" in thickness was subjected to a voltage of 12,500 volts D.C. obtained from a 15 kc. voltage supply according to FIG. 1. The voltage was applied across the thickness of the ceramic body by means of electrodes applied to the opposite faces of the body for a period of about 20 minutes.

By using the method according to the present invention, it is possible to polarize the ceramic bodies so well so that the usual supplemental polarization treatment consisting of submitting the ceramic body to vibrations at its fundamental resonance frequency can be dispensed with. Moreover, because the current drawn by the method of the present invention is so low, the internal heating of the ceramic body is so slight that there is substantially no chemical deterioration, for example reduction of the ceramic, and no thermal cracking. The use of the direct current from the high frequency power supply also eliminated the need for edge-polishing of the ceramic bodies to prevent arcing and dielectric breakdown, which steps were often necessary during polarization with direct current from conventional power supplies.

All of these advantages are achieved, moreover, not just in producing a polarization effect which is as good as that achieved by conventional polarization methods, but are achieved while producing improved polarized properties as compared with the polarized properties achieved by conventional polarization methods.

It is thought that the invention and its advantages will be understood from the foregoing description and it is apparent that various changes may be made in the steps of the method without departing from the spirit and scope of the invention without sacrificing its material advantages, the form hereinbefore described and illustrated in the drawings being merely a preferred embodiment thereof.

We claim:

1. A method of polarizing a polycrystalline ceramic body, consisting of the steps of generating a direct current from an alternating current voltage having a frequency in the range of from 15–25 kc., and applying across the thickness of the body the thus generated direct current at a voltage of from 50–200 volts per mil thickness of the body.

2. A method of polarizing a polycrystalline ceramic body as claimed in claim 1 in which the total voltage applied is from about 1,000 to about 30,000 volts and the voltage is applied for a period of from about 15 to about 30 minutes.

3. A method of polarizing a polycrystalline ceramic body, consisting of the steps of generating a direct current from an alternating current voltage having a frequency in the range of from 15–25 kc., and applying across the thickness of a body of lead zirconate-titanate the thus generated direct current at a voltage of from 50–200 volts per mil thickness of the body, the total voltage being from about 1,000 to about 30,00 volts, and the voltage being applied for a period of from about 15 to about 30 minutes.

References Cited

UNITED STATES PATENTS

| | | | |
|---|---|---|---|
| 2,538,554 | 1/1951 | Cherry | 317—262 |
| 2,702,427 | 2/1955 | Roberts | 29—25.35 |
| 2,706,326 | 4/1955 | Mason | 29—25.35 |
| 2,708,243 | 5/1955 | Brajer | 310—8 |
| 3,108,211 | 10/1963 | Allemon et al. | 317—262 |
| 3,310,720 | 3/1967 | King et al. | 317—262 |

MILTON O. HIRSHFIELD, *Primary Examiner.*

J. A. SILVERMAN, *Assistant Examiner.*